July 31, 1934.   D. J. MORAN ET AL   1,968,566
PUMP ASSEMBLY
Filed Nov. 5, 1932
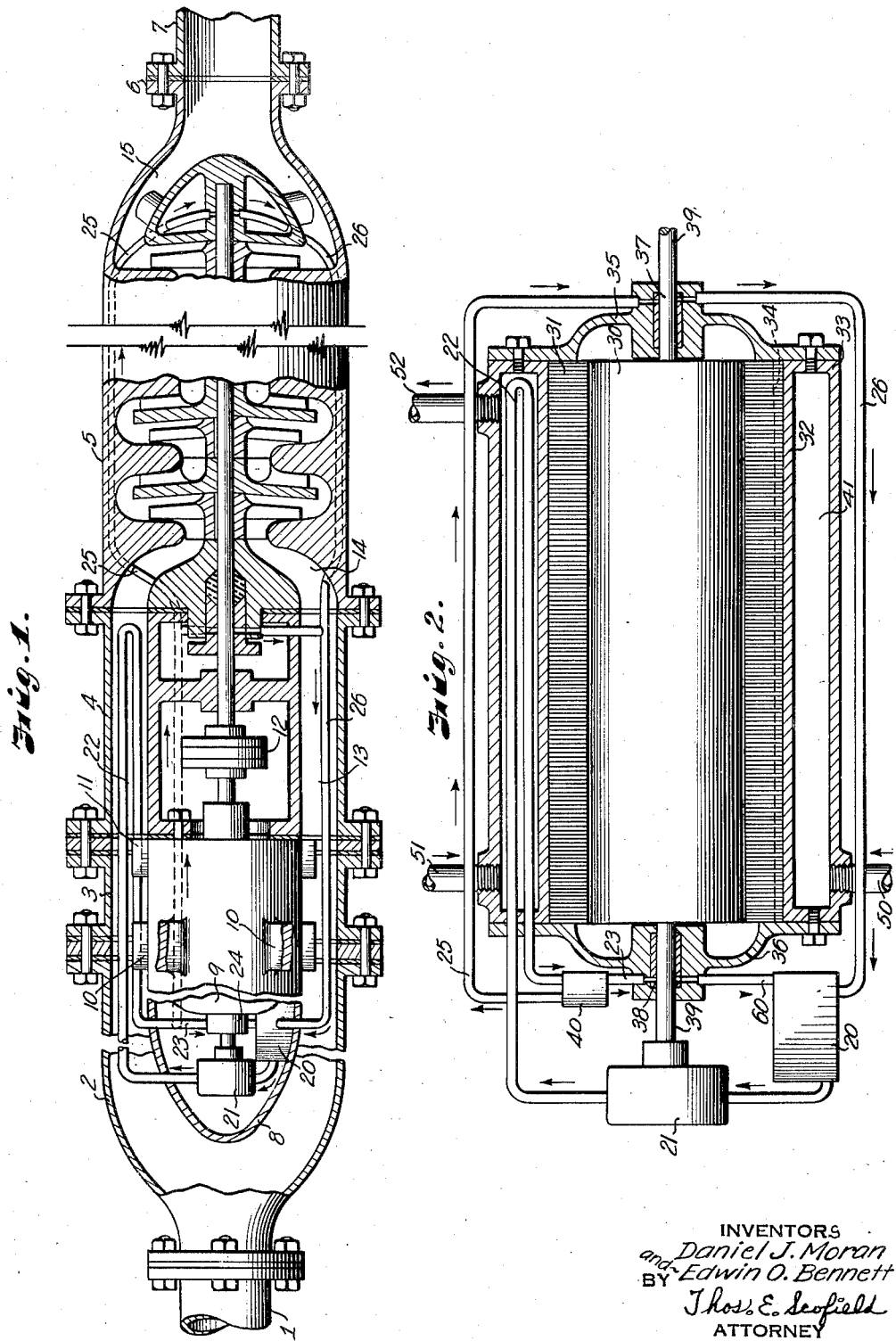
INVENTORS
Daniel J. Moran
and Edwin O. Bennett
BY Thos. E. Scofield
ATTORNEY

UNITED STATES PATENT OFFICE 1,968,566

PUMP ASSEMBLY

Daniel J. Moran and Edwin O. Bennett, Ponca City, Okla., assignors to Continental Oil Company, Ponca City, Okla., a corporation of Delaware Application November 5, 1932, Serial No. 641,420

2 Claims. (Cl. 103—87)

Our invention relates to pump assemblies and more particularly to an assembly in which a pump is driven by an electric motor which is cooled by the liquid being pumped.

This application is a continuation in part of our copending application, Serial No. 618,793, filed June 22, 1932.

When electric motors are used as prime movers for driving pumps which handle inflammable liquids such as for example, gasoline, great care must be taken to guard against fire and explosions which might result from the sparking of the commutator or the overheating of the motor. In general, it has been the practice to use air as a means for cooling electric motors by permitting it to pass through and around the windings of the motor. It will be appreciated that, due to its low specific heat, large volumes of air must be circulated to cool the motor sufficiently and to keep it at a suitable operating temperature. Frequently it is necessary to resort to additional means for circulating air. When air is used as a cooling means, the windage and friction losses are high. This entails a loss of motor efficiency.

One object of our invention is to provide a motor construction in which the motor is cooled by heat exchange with the liquid being pumped.

Another object of our invention is to provide a motor which is tightly encased to prevent air circulation within the motor thereby reducing friction and windage losses, while at the same time cooling the motor externally by heat exchange.

Another object of our invention is to provide a lubricating system in which the oil is continually cooled by heat exchange with the liquid being pumped.

Other objects of our invention will appear from the following description.

In general, our invention contemplates a motor and pump construction capable of being inserted in alignment in a pipe line as shown in our copending application, Serial No. 618,793 in which small clearances exist between the rotor and the stator. We contemplate sealing the motor tightly in order to reduce windage and friction losses. A jacket is provided around the motor through which the liquid being pumped is circulated. The stator of the motor (we prefer using an alternating current motor) is in close contact with the wall of the jacket so that the heat is transmitted directly to the jacket and conducted away by the circulating fluid. It is to be understood that we consider our invention of broad utility, that is, it may be employed for pumping other liquids and in other pumping construction. We have found that we are able to conduct away the heat from the outer periphery of the stator by liquid at such a rate that our motor will run cooler than the customary air cooled motor. As a matter of fact, by keeping the motor cooled with liquid, we have been able to reach efficiencies as high as 96.5% on motors up to 800 horsepower with power factors as high as 93%. The stator laminations are pressed against the jacket and are held against rotation by a key and slot parallel to the axis of the motor. The construction is such that the entire motor may be removed by taking off the end plates and pulling it from the double walled outer frame.

A lubricant pump is provided to circulate lubricating oil to the motor bearings and to the pump bearings. A continuous circulating system is provided and one part of the ring is disposed within the cooling jacket of the motor so that the lubricant will be cooled by heat exchange.

In the accompanying drawing which form part of the instant specification and which are to be read in conjunction therewith;

Figure 1 shows a longitudinal section of a motor and pump assembly in place in a pipe line embodying one mode of carrying out our invention.

Figure 2 shows a modification in which our invention is applied to an electric motor which may or may not be placed in a pipe line, but is used to drive a pump and is provided with a cooling jacket.

More particularly referring now to the drawing, a pipe line 1 has flanged thereto an assembly consisting of an enlarged housing 2, a connecting member 3, an intermediate housing 4, and a pump housing 5 which terminates in a flange which is to be flanged to the pipe line 7. An air tight casing 8 encloses an electric motor 9 which is supported by means of spider arms 10 and 11 as can be readily seen by reference to the drawing. Surrounding the motor which is coupled to pump 5 by means of coupling 12 is an oil passage 13 which forms a jacket for the motor as can be readily seen by reference to the figure. The oil entering the pipe line passes through the annular jacket space 13 to the pump through annular passage 14 and is discharged from the pump through annular passage 15 to the pipe line 7. A sump 20 is provided from which oil circulating pump 21 takes suction and pumps the oil through heat exchange coil 22 disposed in the jacket space 13. The cooled oil is passed to motor and pump bearings by suitable means.

For example, pipe line 23 supplies motor bearing 24. Branch line 25 supplies oil to the pump bearings as can be readily seen by reference to the figure.

The oil, after lubricating the bearings, is collected in return line 26 where it passes through the sump 20 and is recirculated.

Referring now to Figure 2, the rotor of the motor 30 is closely spaced to the stator laminations 31 which are firmly held in contact with the inner wall 32 of the jacket 33. The stator laminations are held against rotation by means of a key 34 which is formed integrally or secured to the inner wall of the jacket 32 in any suitable manner. End plates 35 and 36 completely enclose the motor together with the jacket 33. Motor bearings 37 and 38 are provided in the end plates. The motor shaft 39 passes through the bearings. Oil from the oil sump 20 is picked up by circulating pump 21 which is secured to the motor shaft 39 and driven thereby and is pumped through heat exchanger coil 22 which may be of any suitable design. It is to be noted that heat exchange coil 22 is located in the jacket space 41. The motor drives a suitable pump through shaft 39. The discharge end of this pump may discharge all or part of the liquid being pumped to lines 50 and 51 where the liquid being pumped passes through the jacket space 41 as shown by the arrows and is discharged through pipe 52 at any suitable point as desired. The oil leaves the heat exchange coil 22 and passes through side feed member 40 through line 23 and branch line 25 to the bearings 37 and 38. Oil from the bearings is returned to the sump through lines 60 and 26 as can be readily seen by reference to Figure 2.

It will be readily appreciated that we have accomplished the objects of our invention. We are able to guard against fire and explosions by enclosing the motor in a tight casing which is cooled by means of a jacket. The stator laminations are in close contact with the jacket walls and the liquid being pumped or at least a portion thereof passes through the jacket to keep the motor cool. Likewise, an oil circulating system is provided in which the oil is kept reduced in temperature by means of the heat exchange member disposed in the jacket. We are able to conduct away a large quantity of heat and increase the motor efficiency. The windage losses and resistance to rotation are reduced by the use of small clearances together with the air tight motor casing. The motor is readily removable and its bearings are provided with a continuous lubrication of cooled lubricant. We have provided a fluid cooled, gas tight, explosion proof motor which may be cooled either by inflammable or non-inflammable liquids. The motor is capable of high overloads continuously due to the ability of our jacket and lubrication system to remove the heat as fast as it is generated.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. An oil pipe line high speed pump-motor assembly comprising in combination a casing having means for placing the same in longitudinal alignment with an oil pipe line, a motor housing supported within said casing, the casing and the housing forming an annular oil passageway, an electric motor disposed in said housing in airtight relationship to the exterior thereof and having its stator contacting said housing substantially throughout its length, a pump driven by said motor adapted to move oil through said annular passageway to cool said motor, bearings for said motor and pump, a rotary oil circulating pump within said housing driven by said motor, a closed oil circulating system integral with the pump motor assembly and wholly contained therein connected with said oil circulating pump and bearings for establishing an oil circulation from the oil pump to the bearings and back to said oil pump and heat exchange means interposed in said oil circulating system disposed in said passageway.

2. A pump motor assembly comprising in combination, a casing, a motor housing supported within said casing, the casing and the housing forming an annular oil passageway; an electric motor disposed in said housing in air tight relationship to the exterior thereof and having its stator contacting said housing substantially throughout its length, a pump driven by said motor adapted to move oil through said annular passageway to cool said motor, bearings for said motor and pump, a rotary oil circulating pump within said housing driven by said motor, a closed oil circulating system integral with the pump motor assembly and wholly contained therein connected with said oil circulating pump and bearings for establishing an oil circulation from the oil pump to the bearings and back to said oil pump, and heat exchange means interposed in said oil circulating system disposed in said passageway.

DANIEL J. MORAN.
EDWIN O. BENNETT.